United States Patent
Bodenhamer

(10) Patent No.: US 8,402,011 B1
(45) Date of Patent: Mar. 19, 2013

(54) SYSTEM AND METHOD FOR MANAGING USER WEB BROWSING INFORMATION

(75) Inventor: Albert Scott Bodenhamer, Milpitas, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/270,172

(22) Filed: Oct. 10, 2011

(51) Int. Cl.
  *G06F 17/30* (2006.01)
  *G06F 15/16* (2006.01)

(52) U.S. Cl. ........ 707/706; 707/709; 707/710; 707/766; 707/782; 709/203; 709/219

(58) Field of Classification Search .......... 707/705–712, 707/732–733, 758, 766–767, 770, 778, 779, 707/782–785, 768; 709/203–204, 206, 224, 709/218, 245, 219–220; 705/26.1; 706/45–50
See application file for complete search history.

(56) References Cited

U.S. PATENT DOCUMENTS

| | | | | |
|---|---|---|---|---|
| 5,928,363 | A * | 7/1999 | Ruvolo | 726/22 |
| 7,529,808 | B1 * | 5/2009 | Trevathan et al. | 709/217 |
| 2005/0193328 | A1 * | 9/2005 | Agrawala et al. | 715/513 |
| 2005/0198220 | A1 * | 9/2005 | Wada et al. | 709/220 |
| 2006/0129533 | A1 * | 6/2006 | Purvis | 707/3 |
| 2007/0016543 | A1 * | 1/2007 | Epling et al. | 707/1 |
| 2008/0209050 | A1 * | 8/2008 | Li | 709/227 |
| 2009/0222522 | A1 * | 9/2009 | Heaney | 709/206 |
| 2009/0240686 | A1 * | 9/2009 | Murali | 707/5 |
| 2009/0287657 | A1 * | 11/2009 | Bennett | 707/3 |
| 2009/0293018 | A1 * | 11/2009 | Wilson et al. | 715/811 |

OTHER PUBLICATIONS

Michael Sonntag, Web-browsing history, Web security, Budapest, Feb. 2010, 38 pages.*
Hamid Rastegari et al. "web search personalization based on browsing history by artifical immune system", Int. J. Advance Soft comput. Appl. vol. 2, No. 3, Nov. 2010, pp. 282-301.*
Feng Piu et al. "Automatic identificatinof user interest for personalized search", WWW 2006, pp. 1-10.*

* cited by examiner

*Primary Examiner* — Srirama Channavajjala
(74) *Attorney, Agent, or Firm* — McDermott Will & Emery LLP

(57) ABSTRACT

A system and method is disclosed for managing user web browsing information. A web browser-integrated extension provides one or more controls for selecting how the extension stores web browser information collected during a user's browsing session. On a first selection, the extension automatically transmits user-identifiable web browsing information to a first remote storage. On a second selection, the extension automatically transmits anonymous web browsing information to a second remote storage. On a third selection, a transmissions of web browsing information is stopped.

20 Claims, 6 Drawing Sheets

SYSTEM AND METHOD FOR MANAGING USER WEB BROWSING INFORMATION

TECHNICAL FIELD

The subject technology relates generally to web browsers, namely web browser extensions.

BACKGROUND

Some websites, including search engines, are capable of supplementing web content with personalized information (for example, advertisements tailored to the user) if, for example, the browser is able to receive third-party cookies, or if other information is available to track a user's browsing patterns. Due to privacy concerns and lack of control over how information is collected, many users elect to disable tracking of browsing patterns.

SUMMARY

The subject technology provides a system and method for managing remote storage of web browsing information. According to one aspect, the system includes a computer-enabled device and one or more servers at a remote location. The computer-enabled device includes a device memory having storage control instructions thereon that, when executed, cause the device to provide a browser extension, integrated with a web browser, including a plurality of mutually exclusive selections related to storing browsing information associated with a browsing pattern of a user. The storage control instructions, when executed, further cause the device to transmit the browsing information during a browser session to the remote location, wherein the browsing information is transmitted with user-identifying information on a first selection, transmitted without the user-identifying information on a second selection, and the transmission of the browsing information is stopped on a third selection.

The one or more servers include one or more server memories having server instructions thereon that, when executed, cause the one or more servers to receive the browsing information from the computer-enabled device, provide at least a portion of the browsing information with user-identifying information to a website for personalization of web content displayed to a user associated with the browsing information, and provide at least a portion of the browsing information without user-identifying information to the website for personalization of web content displayed to one or more users not associated with the browsing information.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
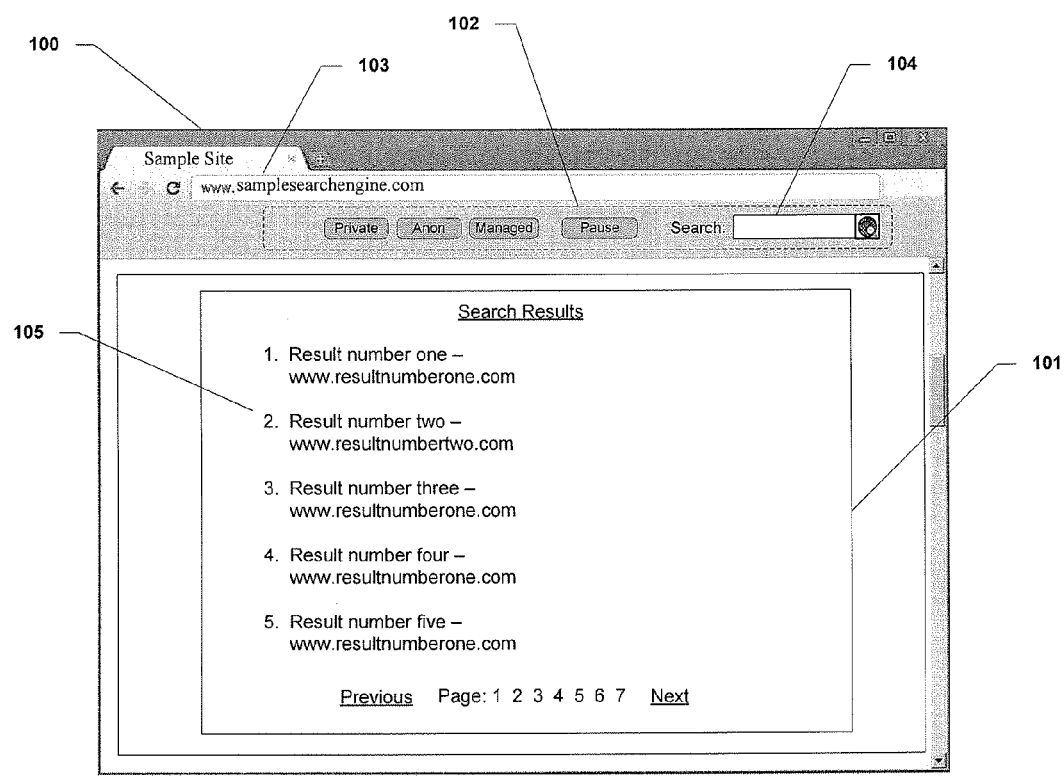
FIG. 1 is a diagram of a web browser, including a browser extension for managing user browsing information according to one aspect of the subject technology.

FIG. 1 is a diagram of a web browser, including a browser extension for managing user browsing information according to one aspect of the subject technology. Web browser 100 is provided for display on a computer-enabled device (for example, device 501 of FIG. 5), and includes a content area 101 for displaying websites navigated by browser 101, one or more browser extensions 102 (including, for example, a browser-integrated toolbar or other control), and an address bar 103 for user-generated input of a web address. On input of a web address to address bar 103, browser 100 will navigate to a corresponding website for display in content area 101. In one example, browser extension 102 may be a toolbar operably connected to a remote search engine, and integrated with an input 104 (for example, a text box) for receiving a search query to send to the remote search engine. On input of a search query, toolbar 102 may redirect browser 100 to a website associated with the search engine for display of search results 105 in content area 101.

In some aspects, web content received from a website may include personalized information based on a user's history of visits to the website, or similar websites. For example, search results received from a search engine website may include personalization information (for example, providing a ranking of results) based on the searching user's history of visits to the website associated with the search results, and/or the user's interaction with the website or similar websites. The diagrams referenced herein illustrate an example of the subject technology as applied to the personalization of search results received from a search engine. The subject technology, however, may apply in the same or similar manner to any type of website that may include personalized web content.

Figure 2:
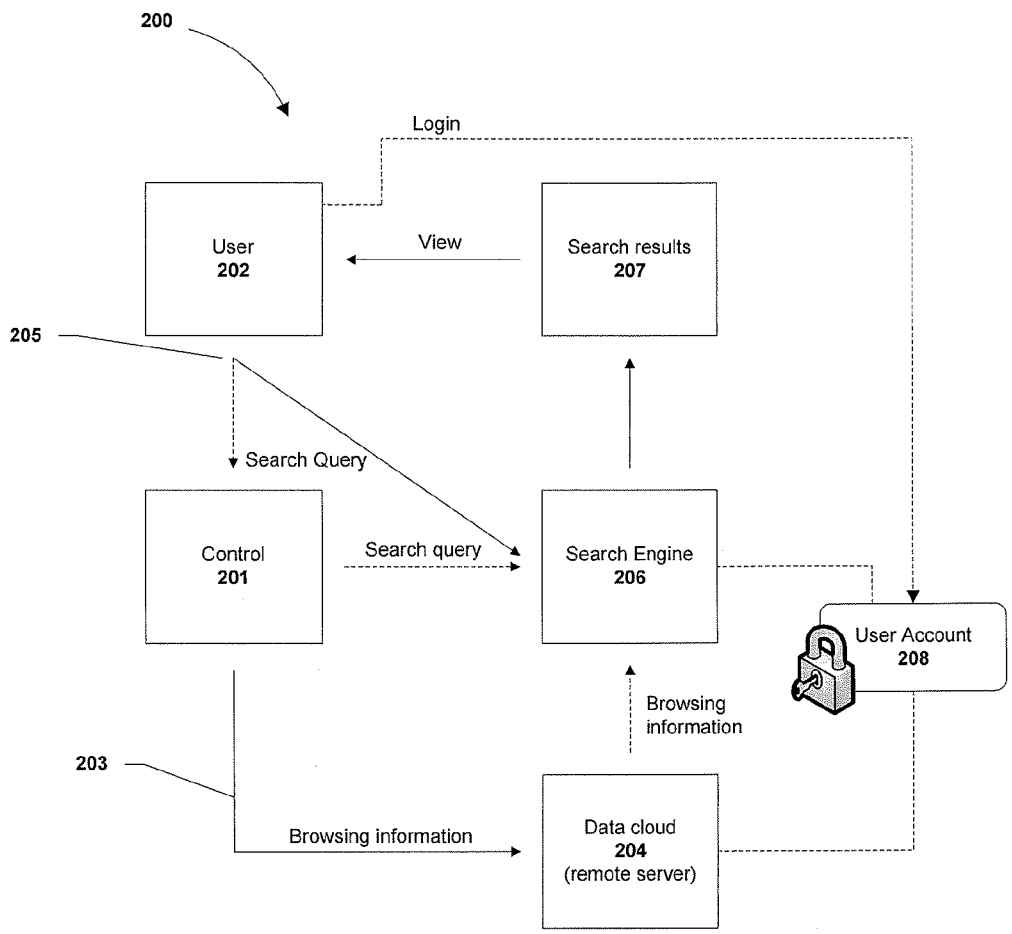
FIG. 2 is a diagram of a system for managing user browsing information according to one aspect of the subject technology.

FIG. 2 is a diagram of a system 200 for managing user browsing information according to one aspect of the subject technology. In order to provide for the personalization of web content, a control 201 (for example, browser extension 102 of FIG. 1) may, on configuration by a user 202, automatically record the user's browsing information 203 (for example, history, search patterns, and other user-approved data) to a data cloud 204 (for example, a remote server). In one aspect, a search query 205 may be input at a web page associated with a search engine 206. In another aspect, search query 205 may be input into a search input of control 201, and control 201 may send the search query to a search engine 206 and navigate the browser (for example, browser 100) to a website associated with search engine 206 to display search results 207. In connection with generating search results 207, search engine 206 may access browsing information 203 to personalize search results 207. Personalization may include improving rankings of search results 207 and/or categorizing them according to one or more interests of user 202, providing tips with and/or highlight search results that likely are of more interest to user 202, provide more search results related to websites of interest, and the like. Personalization may also include rankings and other data compiled from information 203 provided by other users.

In one aspect, control 201 may only record web browsing information 203 while user 202 is logged-in (for example, authenticated) to an account 208. Account 208 may be a web-based email account that is associated with search engine 206 or other website using information 203 to personalize web content. In another aspect, information 203 may be stored in connection with account 208 and system 200 may require user 202 to be logged-in to account 208 before search engine 206 is granted access to information 203 and/or personalize any content. Due to privacy concerns many users may choose to not have their browsing information stored to data cloud 204. Accordingly, user 202 may selectively log out of account 208 or switch to an "incognito" mode to turn off the transmission and/or storage of information 203.

Figure 3:
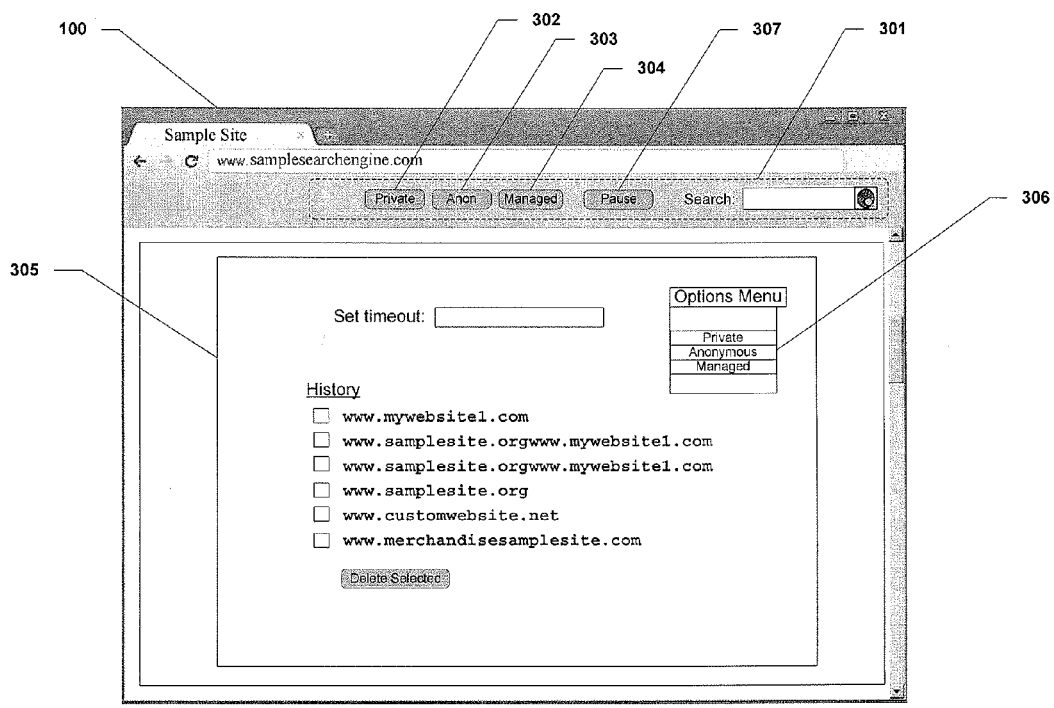
FIG. 3 is a diagram of a web browser, including a screen for managing user browsing information according to one aspect of the subject technology.

FIG. 3 is a diagram of a web browser, including a screen for managing user browsing information according to one aspect of the subject technology. System 200 of the subject technology may include a browser extension 301 (for example, browser extension 102 or control 201) and/or one or more web pages configured to enable a web user to control how web browsing information is stored (for example, in data cloud 204). In one aspect, system 200 may include three modes that may be selectable via one or more controls at browser extension 301. A first mode, selectable via a first control 302, may include a private mode that, when set, no web browsing information is collected or stored to data cloud 204 during the browsing session. A second mode, selectable via a second control 303, may include an anonymous mode that, when set, only anonymous data (for example, only IP address) is stored to data cloud 204. And, a third mode, selectable via a third control 304, may include a managed mode that, when set, information is stored to data cloud 204, but may be controlled and managed by the user. Although shown as graphic push-type buttons, controls 302, 303, and 304 may be implemented by any known means for selecting options on a graphic user interface, including a single control, radio buttons, check boxes, a drop down list or option menu, and the like.

How the information is stored on data cloud 204 may impact the personalization features that are made available to a user. For example, nothing will be recorded or stored when private mode is selected, and thus no data will be made available during the browsing session to contribute to personalization features. When anonymous mode is selected, the user's browsing information 203 will be recorded and/or stored in connection with, for example, non-identifying information such as an IP address. The IP address may be stored, for example, in a database along with browsing history, search patterns, and other data collected from the user during the browsing session. In this manner, no personal information or information connecting the user with the IP address is stored. The stored data may then be made available to an associated website (for example, search engine 206) as part of crowd-sourced data (for example, overall trends based on demographics, general browsing patterns, and the like) for personalization of web content (for example, search results 207) provided to users that visit or use the associated website. Thus, a user browsing the internet in anonymous mode may contribute anonymous information to a pool of data for use by websites (for example, display of advertisements, page rankings, and the like).

When the system is in managed mode, the user's web browsing information 203 may be stored in a managed database that is separate from the database storing anonymous data. Although in separate databases, the data may be stored in the same data cloud 204 (for example, stored on the same database server). In one aspect, data stored in the managed database may be protected and not shared with other users or websites, or with the data stored by the database storing anonymous data. In another aspect, the information may be shared, but without any identifying personal information attached. For example, the data may be provided to other websites in the same way as if it were stored anonymously. In this regard, a user browsing in managed mode may contribute non-identifying information to websites for use in providing personalization features to other users, as well as contribute to an aggregated private pool of data that may be used by a website to provide a web browsing experience tailored to the user's internet behavior. The stored information may be fully accessible to systems trusted by the user, but remains limited and/or anonymous to other systems and users.

System 200 may further provide a management screen 305 (for example, a web page), accessible via a control on browser 100 or by navigating browser 100 to a corresponding web address. Screen 305 may allow a user to access, review, and manage information 203 that is stored in data cloud 204. Management screen 305 may also include the same or similar controls described with reference to browser extension 301 to control how web history is stored, selecting one of the previously described modes, and for setting other options. For example, using settings screen 305, the user can review what websites have been stored, and selectively delete some while keeping others, or set preferences for how history information will be stored in future sessions. Settings screen 305 may also include an option menu 306 for selecting, for example, the previously described modes. In another aspect, option menu 306 may be also be provided on browser extension 301 as an alternative to the depicted buttons 302, 303, and 304.

In another aspect, management screen 305 and/or browser extension 301 may also include a "pause web history" button 307 to temporarily set the browsing mode to private or anonymous without opening a new browser window. In this regard, the user can instantaneously turn off or turn on the automatic recording of information 203 before traveling to or from a particular website. In a further aspect, system 200 may include an anonymous timeout feature. If the user has opted into storing browsing information 203 in cloud 204 (for example, due to browsing while signed into his or her account), but has temporarily disabled the automatic recording and/or storing of browsing information 203, system 200 may switch back to a managed mode after a predetermined period of time (for example, 1 hour of browsing time). To this end, the pause and/or timeout functionality may span multiple sessions or, in other aspects, end on an event such as closing the we browser.

Figure 4:
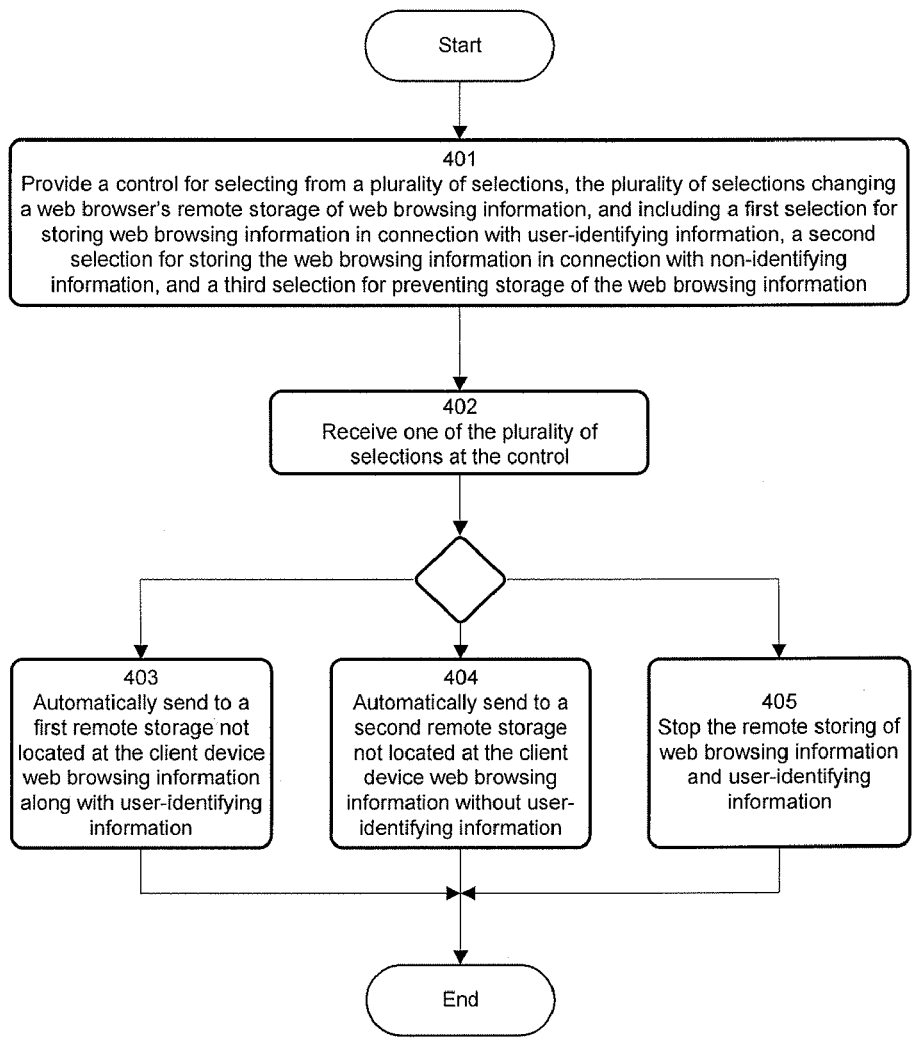
FIG. 4 is a flowchart illustrating a process for managing user browser information according to one aspect of the subject technology.

FIG. 4 is a flowchart illustrating a process for managing user browser information according to one aspect of the subject technology. In a first procedure 401, a computer-enabled device provides a control for selecting from a plurality of selections, the plurality of selections changing a web browser's remote storage of web browsing information, and including a first selection for storing web browsing information in connection with user-identifying information, a second selection for storing the web browsing information in connection with non-identifying information, and a third selection for preventing storage of the web browsing information. In a second procedure 402, one of the plurality of selections is received at the control. Each of the plurality of selections defines how web browsing information will be stored. In a third procedure 403, a first selection automatically sends to a first remote storage not located at the client computing device, web browsing information along with user-identifying information. In a fourth procedure 404, a second selection automatically sends to a second remote storage web browsing information without user-identifying information. In a fourth procedure 405, a third selection stops the remote storing of web browsing information and user-identifying information. In one aspect, each of the foregoing first, second, and third selections are mutually exclusive of each other.

Figure 5:
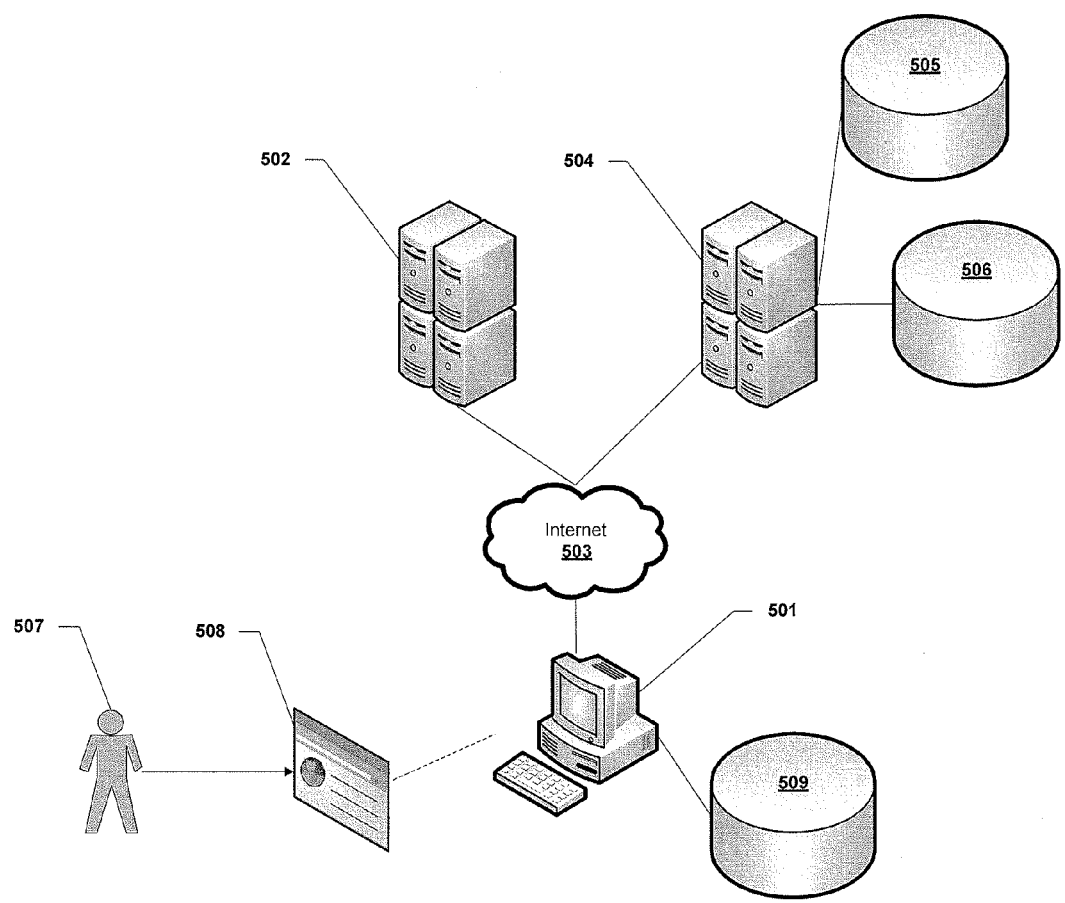
FIG. 5 is an exemplary diagram illustrating server and database components of a system for managing user browser information according to one aspect of the subject technology.

FIG. 5 is an exemplary diagram illustrating server and database components of a system for managing user browser information according to one aspect of the subject technology. A system compatible with the subject technology includes a computer-enabled device 501 (for example a personal computer, PDA, Smartphone or the like) operably connected to a personalization server 502 (for example, a search engine having personalization features) via a network 503 (for example, the Internet, LAN/WAN, or the like) for the display of web content (for example, search results). Device 501 may also be operably connected to one or more data servers 504 (for example, data cloud 204) via network 503. Servers 504 may be configured to receive user-related web browsing information (for example, history, search patterns, and other user-approved data) from device 501, and to store the information in one or more data locations depending on the type of data received. For example, data servers 504 may be connected to one or more databases 505 (for example, on a database server) for storing anonymous user browsing information, and one or more databases 506 for storing user-managed browsing information.

A user 507 may use device 501 to connect to the one or more servers 502 to view web content. In one aspect, the one or more servers 502 are operable to receive and respond to user-generated navigation requests from a user interface 508, to serve one or more websites to be displayed at user interface 508. User 507 may interact with user interface 508 (for example, browser 100) provided by device 501, and having controls (for example, drop down lists, selection choices, text inputs or the like) for navigating to and for displaying one or more websites, search results, and the like.

User-related web browsing information (for example, information 203) may also be stored and/or updated in a local memory storage 509 on device 501. Storage 509 may include a persistent memory storage, for example, a SQL database located on device 501. The information stored in storage 509 may then be uploaded to, for example, one or more data servers 504 on a periodic basis. User interface 508, via one or more controls, may also configure device 501 to upload the user browsing information to data server 504 and/or store the information on database 505 or database 506. In other aspects, device 501 and/or server 504 may discard the web browsing information after a predetermined time period (for example, one month), or discard it prior to a predetermined period (for example, purge all visit information prior to the last 30 days). In further aspects, the web browsing information may be managed by settings made at one or more management screens 305 that may be served by server 503 (see, for example, FIG. 3).

Figure 6:
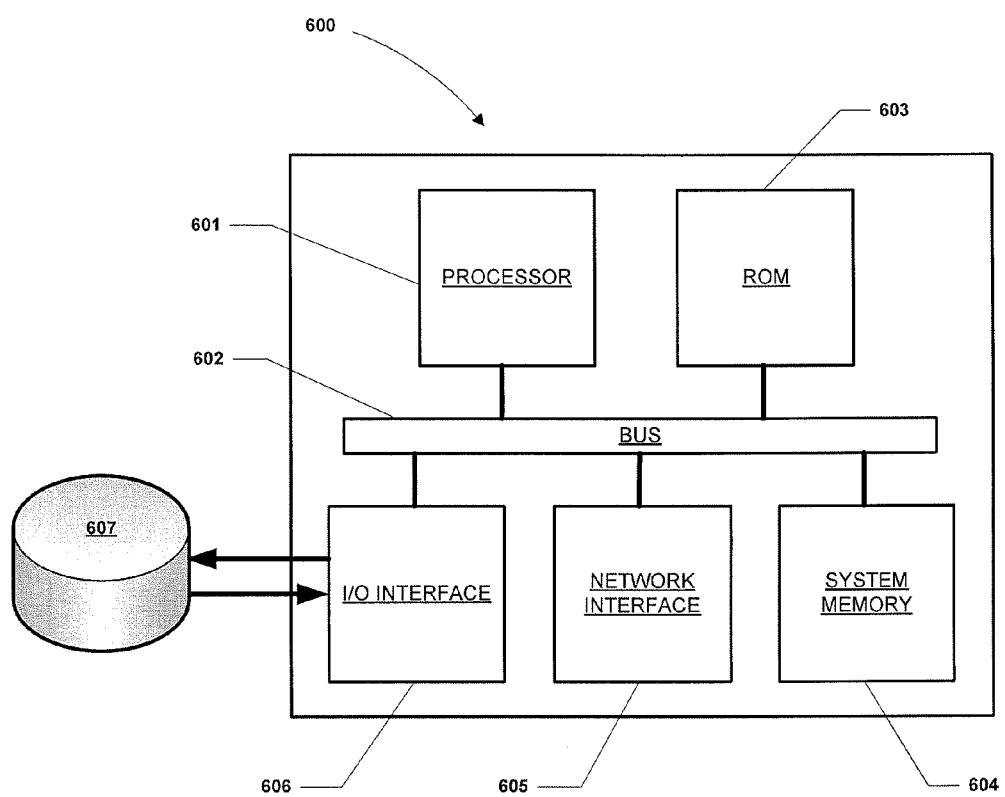
FIG. 6 is a diagram illustrating an exemplary server system for managing web history usage, including a processor and other internal components, according to one aspect of the subject technology.

FIG. 6 is a diagram illustrating an exemplary server system for managing web history usage, including a processor and other internal components, according to one aspect of the subject technology. In some aspects, a computerized device 600 (for example, computer-enabled device 501 or the like) includes several internal components such as a processor 601, a system bus 602, read-only memory 603, system memory 604, network interface 605, I/O interface 606, and the like. In one aspect, processor 601 may also be communication with a storage medium 607 (for example, a hard drive, database, or data cloud) via I/O interface 606. In some aspects, all of these elements of device 600 may be integrated into a single device. In other aspects, these elements may be configured as separate components.

Processor 601 may be configured to execute code or instructions to perform the operations and functionality described herein, manage request flow and address mappings, and to perform calculations and generate commands. Processor 601 is configured to monitor and control the operation of the components in server 600. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 601. Likewise, one or more sequences of instructions may be software stored and read from system memory 605, ROM 603, or received from a storage medium 607 (for example, via I/O interface 606). ROM 603, system memory 605, and storage medium 607 represent examples of machine or computer readable media on which instructions/code may be executable by processor 601. Machine or computer readable media may generally refer to any medium or media used to provide instructions to processor 601, including both volatile media, such as dynamic memory used for system memory 604 or for buffers within processor 601, and non-volatile media, such as electronic media, optical media, and magnetic media.

In some aspects, processor 601 is configured to communicate with one or more external devices (for example, via I/O interface 606). Processor 601 is further configured to read data stored in system memory 604 and/or storage medium 607 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like.

In some aspects, system memory 604 represents volatile memory used to temporarily store data and information used to manage device 600. According to one aspect of the subject technology, system memory 604 is random access memory (RAM) such as double data rate (DDR) RAM. Other types of RAM also may be used to implement system memory 604, Memory 604 may be implemented using a single RAM module or multiple RAM modules. While system memory 604 is depicted as being part of device 600, those skilled in the art will recognize that system memory 604 may be separate from device 600 without departing from the scope of the subject technology. Alternatively, system memory 604 may be a non-volatile memory such as a magnetic disk, flash memory, peripheral SSD, and the like.

I/O interface 606 may be configured to be coupled to one or more external devices, to receive data from the one or more external devices and to send data to the one or more external devices. I/O interface 606 may include both electrical and physical connections for operably coupling I/O interface 606 to processor 601, for example, via the bus 602. I/O interface 606 is configured to communicate data, addresses, and control signals between the internal components attached to bus 602 (for example, processor 601) and one or more external devices (for example, a hard drive). I/O interface 606 may be configured to implement a standard interface, such as Serial-Attached SCSI (SAS), Fiber Channel interface, PCI Express (PCIe), SATA, USB, and the like. I/O interface 606 may be configured to implement only one interface. Alternatively, I/O interface 606 may be configured to implement multiple interfaces, which are individually selectable using a configuration parameter selected by a user or programmed at the time of assembly. I/O interface 606 may include one or more buffers for buffering transmissions between one or more external devices and bus 602 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer implemented method for managing remote storage of web browsing information, the method comprising:
    providing a control, integrated with a web browser located at a client computing device, for enabling a user to select one of a plurality of modes, the plurality of modes enabling a user to control how web browsing information is stored remote from the client computing device, the plurality of modes comprising a first mode, a second mode, and a third mode;
    receiving at the control a selected one of the plurality of modes;
    on receiving a selection of the first mode, providing for the control to automatically send, to a first remote storage, the web browsing information along with user-identifying information, the user-identifying information being associated with a user account;
    on receiving a selection of the second mode, providing for the control to send, to a second remote storage, the web browsing information without identifying the user; and on receiving a selection of the third mode, providing for the control to prevent storage of the web browsing information at the first remote storage, wherein, on receiving the selection of the second mode after receiving the selection of the first mode, the sending of user-identifying information is stopped and the web browsing information is automatically sent to the second remote storage without identifying the user.

2. The computer implemented method of claim 1, further comprising:

providing, on receiving the selection of the second mode, the web browsing information without identifying the user to a website, for personalization of web content provided to users not associated with the user.

3. The computer implemented method of claim 1, wherein the website is a search engine website and the web content includes search results.

4. The computer implemented method of claim 1, further comprising:

receiving at the control, a selection of the third mode; and
on receiving the selection of the third mode, stopping the remote storing of the web browsing information and the user-identifying information.

5. The computer implemented method of claim 1, wherein the selected one of the plurality of modes is the first mode, the method further comprising:

receiving at the control, a selection of the third mode; and
on receiving the selection of the third mode, stopping the storage of the web browsing information and the user-identifying information.

6. The computer implemented method of claim 1, further comprising:

receiving at the control a selection to pause web browsing information; and
suspending the remote storage of the web browsing information for a predetermined amount of time.

7. The computer implemented method of claim 1, wherein the selected one of the plurality of modes is the first mode, the method further comprising:

providing the web browsing information and user-identifying information to a website for personalization of web content displayed by the web browser.

8. The computer implemented method of claim 1, the method further comprising:

displaying a management screen providing a plurality of management controls configured to manage and control the web browsing information stored in the first remote storage.

9. The computer implemented method of claim 1, wherein the control is a browser extension.

10. A machine-readable medium having machine-executable instructions stored thereon, which when executed by a machine or computer cause the machine or computer to perform a method of managing remote storage of web browsing information, the method comprising:

receiving, from a user, a selected one of a plurality of mutually exclusive selections at a control, the control being integrated with a web browser, each of the plurality of selections corresponding to a mode for changing how the web browser remotely stores web browsing information;

on receiving a selection associated with a first mode, automatically transmitting during a web browsing session, from the control, user-identifiable web browsing information to a first remote storage, the user-identifiable web browsing information comprising information associated with a user account;

on receiving a selection associated with a second mode, automatically transmitting during the web browsing session, from the control, anonymous web browsing information to a second remote storage without identifying the user; and on receiving a selection associated with a third mode, preventing the transmission of all web browsing information, wherein, on receiving the selection associated with the second mode after receiving the selection associated with the first mode, the transmission of user-identifiable web browsing information is suspended and the anonymous web browsing information is automatically sent to the second remote storage.

11. The machine-readable medium of claim 10, wherein the selected one of the plurality of mutually exclusive modes is the selection associated with the first mode, the method further comprising:

on receiving a selection to pause the automatic transmission of user-identifiable web browsing information to the first remote storage, suspending the transmission of user-identifiable web browsing information for a predetermined amount of time.

12. The machine-readable medium of claim 10, wherein the selected one of the plurality of mutually exclusive modes is the selection associated with the second mode, the method further comprising:

providing, on receiving the selection associated with the second mode, the anonymous web browsing information to a website for personalization of web content provided to users not associated with a provider of the anonymous browsing information.

13. The machine-readable medium of claim 10, wherein the selected one of the plurality of mutually exclusive modes is the selection associated with the first mode, the method further comprising:

providing the user-identifiable web browsing information to a website for personalization of web content displayed by the web browser, wherein the website is associated with the user account.

14. The machine-readable medium of claim 10, wherein the control includes a plurality of graphically displayed buttons, a button corresponding to one of the plurality of selections.

15. The machine-readable medium of claim 10, the method further comprising:

on receiving a selection associated with a fourth mode, displaying a management screen providing a plurality of controls configured to manage and control the user-identifiable browsing information stored in the first remote storage.

16. A system for managing remote storage of web browsing information, comprising:

a processor; and
a memory, the memory including first server instructions that, when executed, cause the processor to provide storage control instructions to a client device for installation and integration with a web browser, wherein the storage control instructions, when executed by the client device, cause the client device to:

provide a plurality of mutually exclusive selections, displayed in connection with a toolbar of the web browser, the selections being related to sending, during a browser session, browsing information associated with a browsing pattern of a user to a remote location not located at the client device, the mutually exclusive selections comprising a first selection, a second selection, and a third selection;
   receive a selected one of the mutually inclusive selections;
   transmit, on receiving the first selection, the browsing information during the browser session to the remote location, wherein the browsing information is transmitted with user-identifying information;
   transmit, on receiving the second selection, the browsing information, to the remote location without identifying the user; and
   prevent, on receiving the third selection, the transmission of the browsing information to the remote location,
wherein the memory further includes second server instructions that, when executed, cause the processor to:
   receive the browsing information from the computer-enabled device;
   provide at least a portion of the browsing information with user-identifying information to a search engine for personalization of search results displayed to a user associated with the browsing information; and
   provide at least a portion of the browsing information without user-identifying information to the search engine for personalization of search results displayed to one or more users not associated with the browsing information.

17. The system of claim 16, wherein the mutually exclusive selections further comprise a fourth selection, wherein the selected one of the mutually inclusive selections is the first selection, and wherein the storage control instructions, when executed, further causes the client device to:
   receiving at the control, the fourth selection;
   suspending, on receiving the fourth selection after receiving the first selection or the second selection, the transmission of the browsing information to the remote location for a predetermined amount of time.

18. The system of claim 16, wherein the second server instructions, when executed, further causes the processor to:
   store the browsing information with the user-identifying information in a first remote storage, not located at the client device, when the first one of the selections is made at the client device; and
   store the browsing information without the user-identifying information in a second remote storage, not located at the client device, when the second one of the selections is made at the client device.

19. The system of claim 18, wherein the first remote storage location is a first database and the second remote storage location is a second database.

20. The system of claim 18, wherein the second server instructions, when executed, further cause the processor to:
   provide for display at the computer-enabled device, a management screen having a plurality of controls configured to manage and control the browsing information stored in the first remote storage location.

* * * * *